United States Patent
Rajapakse

(10) Patent No.: US 9,686,123 B2
(45) Date of Patent: Jun. 20, 2017

(54) SYSTEM FOR MEDIA DISTRIBUTION AND RENDERING ON SPATIALLY EXTENDED WIRELESS NETWORKS

(71) Applicant: Blackfire Research Corporation, San Francisco, CA (US)

(72) Inventor: Ravi Rajapakse, San Francisco, CA (US)

(73) Assignee: Blackfire Research Corporation, San Francisco, CA (US)

( * ) Notice: Subject to any disclaimer, the term of this patent is extended or adjusted under 35 U.S.C. 154(b) by 0 days.

(21) Appl. No.: 15/260,307

(22) Filed: Sep. 8, 2016

(65) Prior Publication Data

US 2017/0111206 A1    Apr. 20, 2017

Related U.S. Application Data

(60) Provisional application No. 62/243,604, filed on Oct. 19, 2015.

(51) Int. Cl.
| | |
|---|---|
| *H04L 12/24* | (2006.01) |
| *H04W 24/02* | (2009.01) |
| *H04W 56/00* | (2009.01) |
| *H04W 84/20* | (2009.01) |

(52) U.S. Cl.
CPC .......... *H04L 41/044* (2013.01); *H04W 24/02* (2013.01); *H04W 56/0015* (2013.01); *H04W 84/20* (2013.01)

(58) Field of Classification Search
CPC .. H04L 41/44; H04W 24/02; H04W 56/0015; H04W 84/20

USPC ............................................... 455/41.1, 41.2
See application file for complete search history.

(56) References Cited

U.S. PATENT DOCUMENTS

| | | | | |
|---|---|---|---|---|
| 5,787,439 A | * | 7/1998 | Taysom | G06F 17/30958 |
| 5,832,487 A | * | 11/1998 | Olds | G06F 17/30575 |
| 5,924,094 A | * | 7/1999 | Sutter | G06F 17/30575 |
| 6,192,365 B1 | * | 2/2001 | Draper | G06F 9/466 |
| | | | | 707/648 |
| 6,343,299 B1 | * | 1/2002 | Huang | G06F 17/30578 |
| | | | | 707/638 |
| 6,681,370 B2 | * | 1/2004 | Gounares | G06F 17/227 |
| | | | | 707/999.201 |
| 6,751,248 B1 | * | 6/2004 | Tan | H04B 7/269 |
| | | | | 370/337 |
| 7,117,491 B2 | * | 10/2006 | Ferreira Alves | G06F 17/30575 |
| | | | | 707/E17.005 |
| 7,180,915 B2 | * | 2/2007 | Beyer | H04B 7/2662 |
| | | | | 370/516 |

(Continued)

*Primary Examiner* — Hai V Nguyen
(74) *Attorney, Agent, or Firm* — Galvin Patent Law LLC; Brian R. Galvin

(57) ABSTRACT

A system for media distribution and rendering over a spatially extended wireless network, comprising a plurality of media rendering devices configured as nodes in a spatially extended wireless network. The media rendering devices dynamically establish a hierarchical arrangement wherein a first media rendering device acts as a root node of the hierarchical arrangement. The first media rendering device receives media content over a network and distributes the media content to the remaining media rendering devices using the hierarchical arrangement. The media content is rendered synchronously by each of the plurality of media rendering devices.

2 Claims, 11 Drawing Sheets

(56) References Cited

U.S. PATENT DOCUMENTS

| | | | | |
|---|---|---|---|---|
| 7,505,450 | B2* | 3/2009 | Castagnoli | H04L 12/2602 370/254 |
| 7,610,597 | B1* | 10/2009 | Johnson | G06Q 30/02 725/32 |
| 7,793,002 | B2* | 9/2010 | Hieb | H04J 3/0679 707/618 |
| 8,495,674 | B1* | 7/2013 | Johnson | G06Q 30/02 725/134 |
| 8,973,030 | B2* | 3/2015 | Johnson | G06Q 30/02 725/32 |
| 9,125,073 | B2* | 9/2015 | Oyman | H04W 24/04 |
| 9,131,433 | B2* | 9/2015 | Steer | H04L 45/12 |
| 9,219,807 | B1* | 12/2015 | Leopardi | H04B 7/15 |
| 9,351,041 | B2* | 5/2016 | Johnson | G06Q 30/02 |
| D763,821 | S * | 8/2016 | Leopardi | D14/205 |
| 9,444,565 | B1* | 9/2016 | Leopardi | H04H 20/86 |
| D769,841 | S * | 10/2016 | Sahlen | D14/205 |
| 2006/0155778 | A1* | 7/2006 | Sharma | G06F 17/30575 |
| 2008/0005188 | A1* | 1/2008 | Li | G06F 17/30174 |
| 2011/0107369 | A1* | 5/2011 | O'Brien | G06F 17/30029 725/38 |
| 2011/0276585 | A1* | 11/2011 | Wagner | H04N 21/2225 707/769 |
| 2014/0013354 | A1* | 1/2014 | Johnson | G06Q 30/02 725/35 |
| 2014/0040498 | A1* | 2/2014 | Oyman | H04W 24/04 709/231 |
| 2015/0003809 | A1* | 1/2015 | Matsuda | G11B 27/105 386/248 |
| 2015/0208126 | A1* | 7/2015 | Johnson | G06Q 30/02 725/35 |
| 2015/0334157 | A1* | 11/2015 | Oyman | H04W 24/04 709/219 |
| 2016/0219415 | A1* | 7/2016 | Purohit | H04W 4/06 |

* cited by examiner

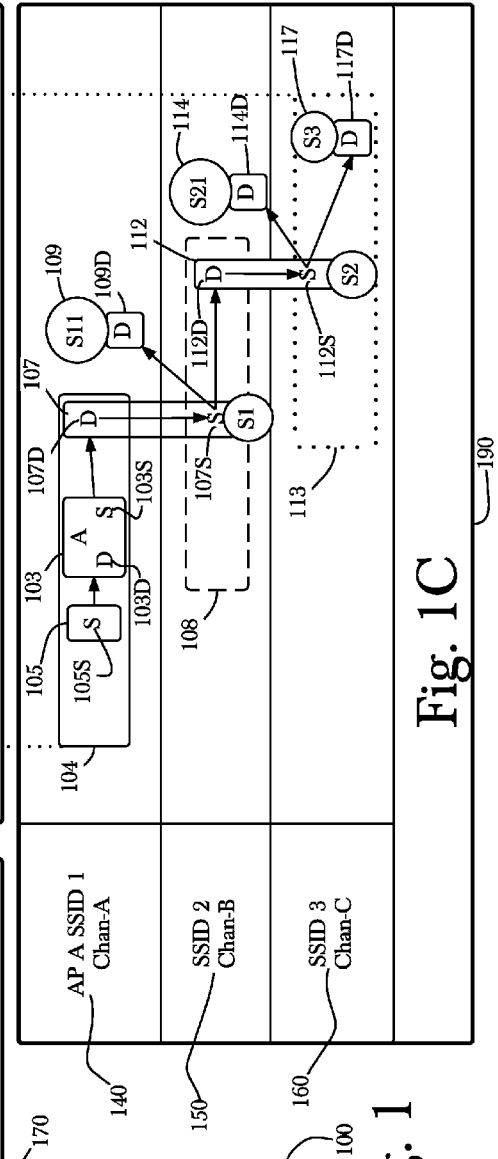
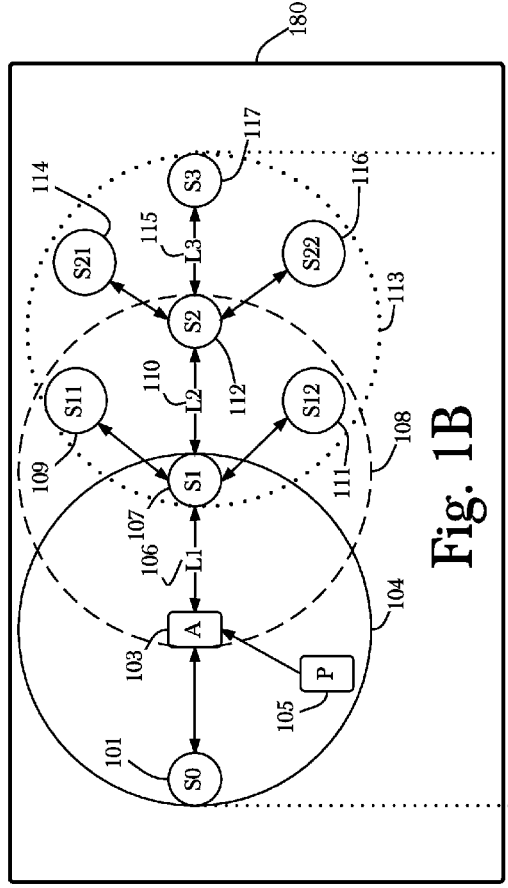
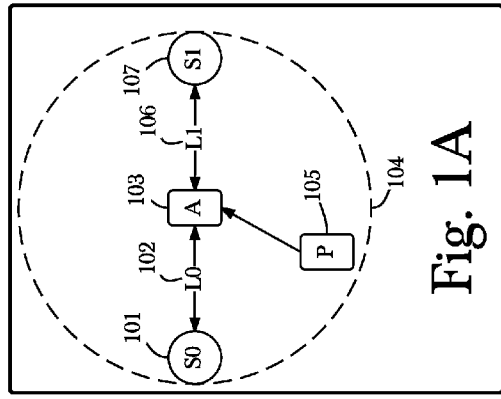

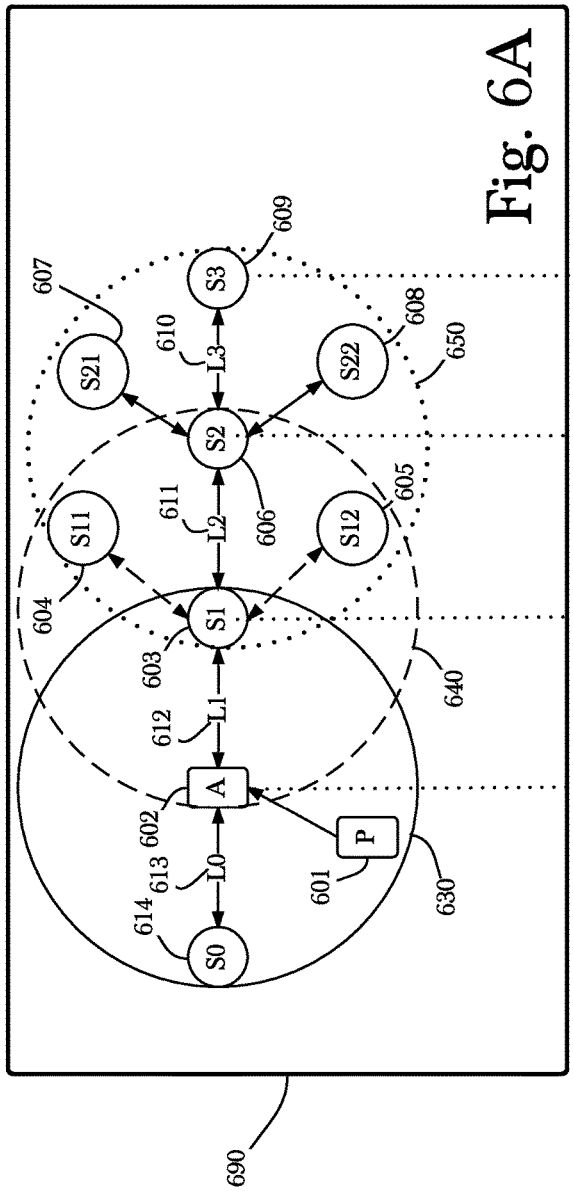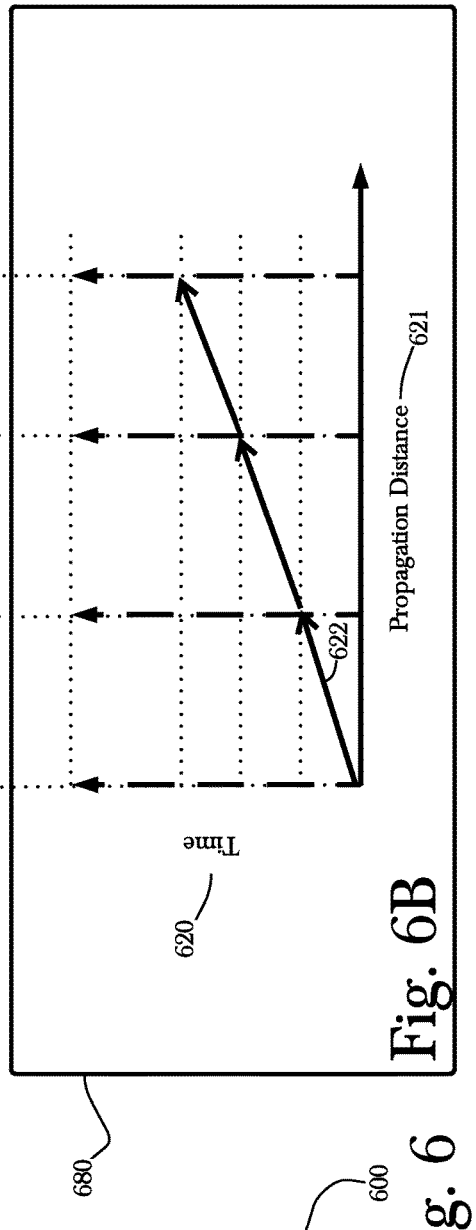
Fig. 6A
Fig. 6B
Fig. 6

SYSTEM FOR MEDIA DISTRIBUTION AND RENDERING ON SPATIALLY EXTENDED WIRELESS NETWORKS

CROSS-REFERENCE TO RELATED APPLICATIONS

This application claims the benefit of, and priority to, U.S. provisional patent application Ser. No. 62/243,604 titled, "Extended Distributed Traffic Aggregation System Enabling Long Range Wi-Fi Media Rendering", and filed on Oct. 19, 2015, the entire specification of which is incorporated herein by reference in its entirety.

BACKGROUND OF THE INVENTION

Field of the Art

The disclosure relates to the field of wireless networking, and more particularly to the field of media distribution and rendering on spatially extended wireless networks.

Discussion of the State of the Art

Currently, there is a trend towards use of mobile devices such as multimedia players, smartphones, tablet computers, or other various mobile electronic devices for media streaming applications. These devices generally have the ability to receive streaming media content over wireless networks and to send one or more channels of the media content to wireless playback devices (such as speakers, stereo receivers, or televisions). Unfortunately, the useful range of current wireless network topologies is spatially limited, drastically curtailing or even precluding playback of media over extended distances—for instance on college campuses, corporate campuses, in towns, cities or parts of cities, or within school buildings, to list a few of many possible examples.

Wireless range may be substantially affected by many issues. Among these are interference from objects, multipath interference, antenna quality of sending and receiving devices, channel congestion, and device processing delays (since streaming media is often only one among several processes demanding processing resources of mobile devices at any given time. As a result, theoretical maximum ranges of various standardized wireless networking protocols are only reached under ideal circumstances, and true effective ranges are typically about half of theoretical maximum ranges. In some cases, maximum data throughput is only achieved at extremely close ranges of about 25 feet. At the outer limits of a device's effective range, data throughput often decreases to around 1 Mbps before it drops out altogether. The reason is that wireless devices dynamically negotiate the top speed at which they can communicate without dropping too many data packets.

What is needed, is a system to significantly extend the spatial range of wireless networks such that playback of media content can encompass large spaces such as campuses, buildings, and even cities, while still providing for synchronous media rendering by many media rendering devices across such spatially extended wireless networks.

SUMMARY OF THE INVENTION

Accordingly, the inventor has conceived and reduced to practice, in a preferred embodiment of the invention, a system and method for media distribution and rendering on spatially extended wireless networks. The following non-limiting summary of the invention is provided for clarity, and should be construed consistently with embodiments described in the detailed description below.

It is very often necessary to locate media rendering devices across long ranges compared to the typical range of Wi-Fi, and to have them play media content synchronously. Generally, this may be achieved, according to various embodiments of the invention, by having media rendering devices each participate in two distinct wireless zones, with zones overlapping physically in order to achieve spatially extended wireless networks that may span many times the maximum range for a given wireless technology. The media rendering devices are arranged in a hierarchical tree arrangement with one device acting as a root node. The hierarchical arrangement is dynamically generated and may be rearranged by the various media rendering devices in order to provide optimal data paths from the root node to each target media rendering node. In this way data latency can be minimized. Furthermore, since numerous small wireless zones are created using the hierarchical arrangement and the ability of each device to act as a member of two different wireless networks, data collisions are minimized and latency is further improved. Streaming media content is either originated at, or received at, the root node. The streaming media content is then delivered via optimal paths to each destination node, potentially traversing several wireless zones as it does so. Additionally, since it is often desirable to stream media to, and render it by, several media rendering devices simultaneously across spatially extended networks, it may be important to synchronize the rendering of media content across the spatially extended wireless network. According to the invention, this may be accomplished by establishing synchronization zones (often but not necessarily coincident with the wireless network zones), with one media rendering device acting as synchronization manager for each synchronization zone. In this way, each media rendering device within each synchronization zone renders media synchronously with the synchronization manager for the zone. A rendering delay for each synchronization zone, which is based on the propagation time for streaming media to move from the root node to the synchronization manager of each synchronization zone, is used to ensure that the synchronization zones (within which rendering is already synchronized) are in turn synchronized with each other, thus providing for synchronous playback across spatially extended wireless networks of arbitrarily large size (i.e., spatial extent).

This application describes a number of elements, in various embodiments, which enable such functionality. One such element is automatic optimal media path detection to each destination device. Another element is distributed device discovery for source devices. A further element is distribution of media to devices via optimal physical paths, even as wireless propagation conditions change over time. Another element is the synchronous rendering of media on many wireless devices connected over a spatially extended wireless network. Not all of these elements are necessarily utilized in each of the various embodiments of the invention described herein.

According to a preferred embodiment of the invention, a system for media distribution and rendering over a spatially extended wireless network is disclosed. The system comprises a plurality of media rendering devices configured as nodes in a spatially extended wireless network. The media rendering devices dynamically establish a hierarchical arrangement wherein a first media rendering device acts as a root node of the hierarchical arrangement. The first media rendering device receives media content over a network and distributes the media content to the remaining media rendering devices using the hierarchical arrangement. The media content is rendered synchronously by each of the plurality of media rendering devices.

According to another preferred embodiment of the invention, a method for media distribution and rendering over a spatially extended wireless network, comprising the steps of: (a) configuring a plurality of media rendering devices each comprising at least one wireless network adapter as nodes of a spatially extended wireless network; (b) dynamically establishing a hierarchical arrangement of the plurality of media rendering devices, wherein a first media rendering device acts as a root node of the hierarchical arrangement; (c) receiving media content via a network at the first media rendering device; (d) distributing the media content to the remaining media rendering devices using the hierarchical arrangement; and (e) synchronously rendering the media content by each of the plurality of media rendering devices.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

FIG. 1 is a network topology diagram consisting of three views: FIG. 1A in plan view, FIG. 1B in plan view, and FIG. 1C taken as a profile view of FIG. 1B, collectively presented to illustrate an exemplary system topology for spatially extended media distribution and rendering, according to a preferred embodiment of the invention.

FIG. 6 is a network topology diagram consisting of two views: FIG. 6A viewed in plan and FIG. 6B taken as a graphical representation of FIG. 6A, collectively presented to illustrate an exemplary system topology for synchronization of media content playback on a spatially extended media distribution and rendering system, according to a preferred embodiment of the invention.

DETAILED DESCRIPTION

Figure 2:
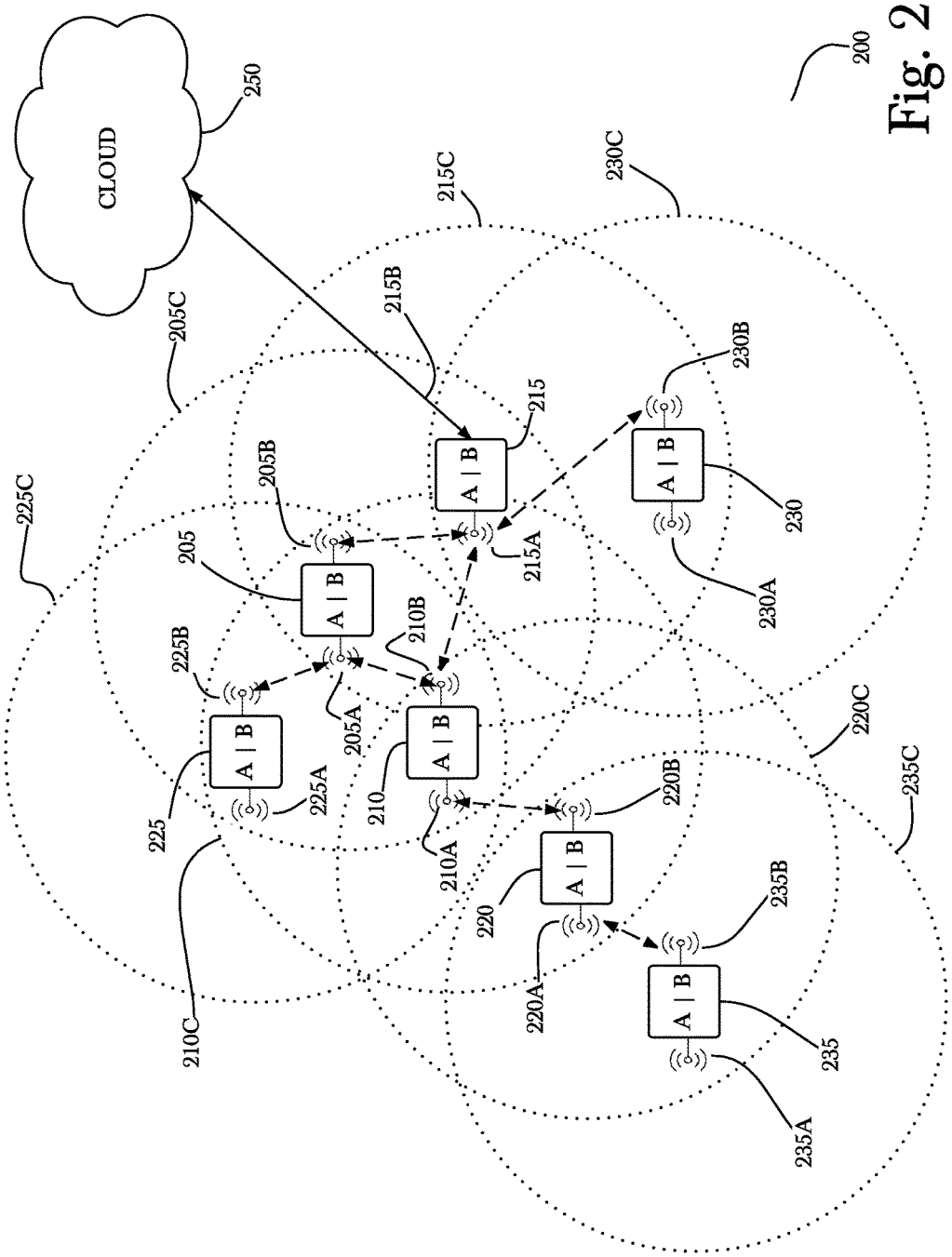
FIG. 2 is a network topology diagram illustrating another exemplary system for spatially extended media distribution and rendering, according to a preferred embodiment of the invention.

The inventor has conceived, and reduced to practice, in a preferred embodiment of the invention, a system and method for media distribution and rendering on spatially extended wireless networks.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

DEFINITIONS

Figure 8:
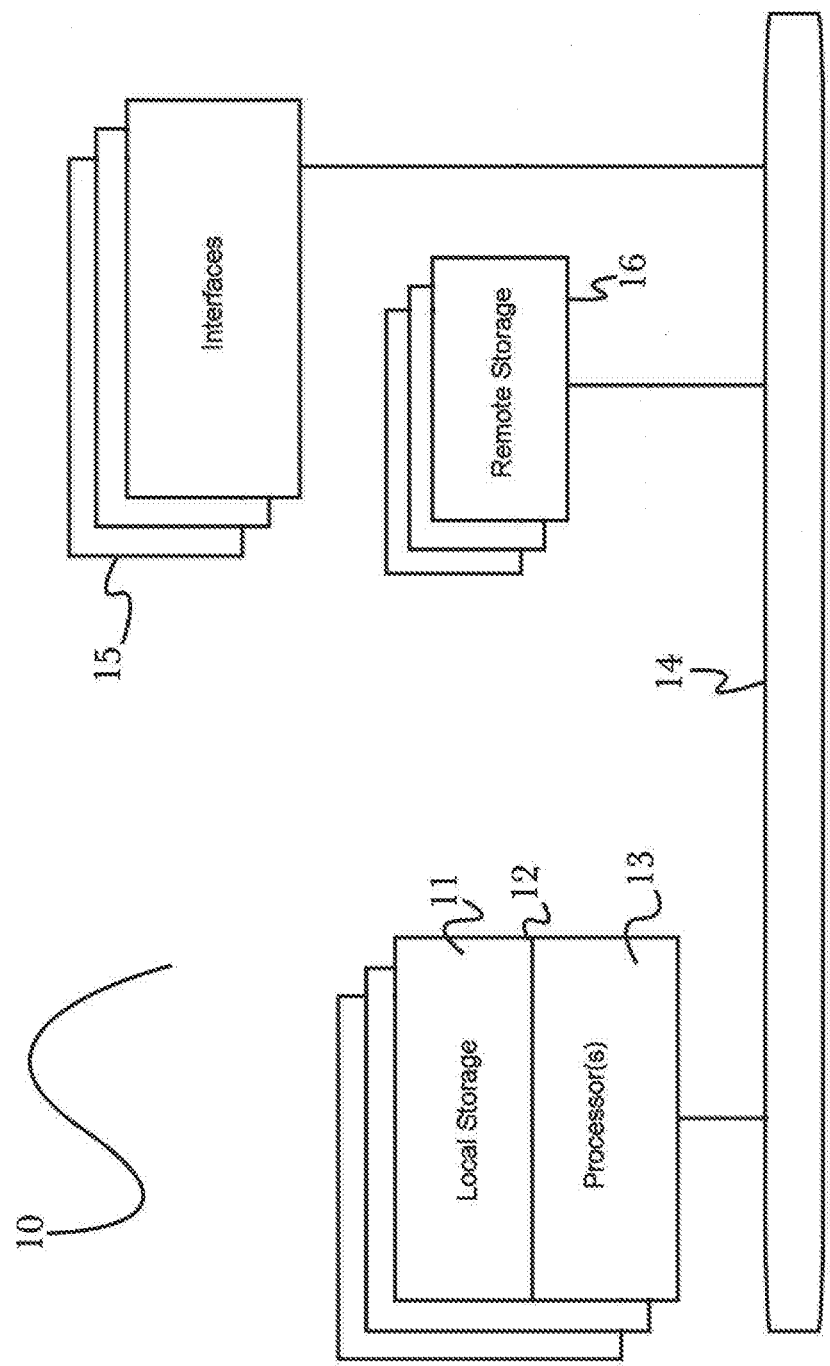
FIG. 8 is a block diagram illustrating an exemplary hardware architecture of a computing device used in an embodiment of the invention.

A "device" within this specification or on any of the figures, whether prefixed by 'S', 'A', 'P', or 'D', or otherwise identified, represents network-connected devices, each comprising at least a wireless network interface 15, a processor 13, and a memory 11, as illustrated in FIG. 8, with at least a plurality of programming instructions stored in the memory 11 and operating on the processor 13, and using the wireless network interface 15 to communicate with other devices within its respective communication cell. Each device may receive media and act as a media destination, D, or send media and act as a media source, S (or indeed it may do both at the same time). Each device may forward media received via destination, D, to other media devices via source, S. Each device may act as an aggregator, meaning it may discover devices local to it (within its extended network, not just within its own communication cell) and retain information about these devices. Devices that are local may be devices that are on a common sub-network and/or devices with a strong received signal strength indication (RSSI) or radio frequency (RF) signal strength. Devices may have both Wi-Fi network client and software access point (Soft AP)/Wi-Fi Direct capabilities; they may be on separate channels for optimal bandwidth distribution; and/or they may be on multiple networks simultaneously.

Conceptual Architecture

FIG. 1 is a network topology diagram 100 consisting of three views: FIG. 1A viewed in plan 170, FIG. 1B viewed in plan 180, and FIG. 1C, 190, shown as a profile view of FIG. 1B 180, collectively presented to illustrate an exemplary system topology for media distribution and rendering across spatially extended wireless networks, according to a preferred embodiment of the invention.

FIG. 1A, 170, depicts a communication cell 104 centered about an access point device A 103, encircled by a dashed line to represent a wireless boundary such as an effective maximum wireless range. Communication cell 104 identifies a signal range associated with the access point A 103. While each device depicted in FIG. 1A may have its own communication cell associated with it, for clarity in this diagram, only communication cell 104 associated with access point A 103 is shown. Access point A 103 communicates with all devices located within its communication cell 104, which in this example include a source device, such as a smartphone, P 105; a source device, such as a software access point, S0 101; and another source device S1 107. In FIG. 1A, P 105 may only see source devices S0 101 and S1 107 as directly connected devices. In another case, all devices 101/103/105/107 may communicate on a single network or channel. However, in such a case, due to Wi-Fi protocols, all communications must take turns using a single channel, meaning, traffic on link L0 102 has to alternate with traffic on link L1 106 in order for S0 101 to communicate with S1 106. This bottleneck may be alleviated by communicating on separate channels; traffic on link L0 102 is unaffected by traffic on link L1 106. Typically for Wi-Fi, communicating on separate channels requires a separate service set identifier (SSID), therefore some devices may need to communicate on multiple SSIDs concurrently. This may be achieved in a plurality of ways. For example, a device may be fitted with two network adapters (with two Wi-Fi radios), one of which may act as a soft access point and another as a client of an adjacent cell's soft access point. Alternatively, one network adapter may alternate communication between two networks, such as by using the concept of virtual dual-band radios; in this case, one physical hardware radio is used to communicate on two bands more or less simultaneously. Yet another possibility would be to use software defined radios which use one unit of radio hardware and cause it to play multiple roles as defined by software resident on the respective device. These examples are not exhaustive, and are exemplary in nature.

Progressing to the next diagram, FIG. 1B, 180, a plurality of devices and their respective communication cells are shown in a cellular arrangement. Cellular arrangements are a form of mesh networking to enable large area coverage. The communication cell 104 centered about the access point device A 103, encircled by a solid line to represent a wireless boundary of access point device A 103, encompass devices P 105, S0 101, and S1 107. Similarly, communication cell 108 surrounds source S1 107 with a dashed line, which communicates with A 103, as well as speakers S11 109 and S12 111, and also source device S2 112 via link L2 110. Further, communication cell 113 surrounds source S2 112 with a dotted line. Line types (solid, dashed, dotted) are for illustration purposes only, and all represent a wireless signal range boundary to the respective communication cell. The network topology 180 in FIG. 1B is structured such that each aggregation device 103, 107, and 112 generates a signal range resulting in an associated communication cell 104, 108, 113, respectively. Accordingly, each aggregation device 103, 107, 112 may communicate with other devices located within its associated communication cell. Additionally, each aggregation device may communicate with other aggregation devices or a source P 105, through links between interconnected aggregation devices 103, 107, 112. For example, source P 105 may connect to aggregation device S3 117 or to speaker S22 116. According to a preferred embodiment, source P 105 connects to aggregation device 103, in this case, an access point A 103. Aggregation devices 103 and 107 connect via link L1 106. Furthermore, aggregation devices 107 and 112 connect via link L2 110. Aggregation device S2 112 connects to speaker S22 116, and it also connects to a further aggregation device S3 117 (communication cell not shown) via link L3 115. In this example, a communications backbone is established between the source P 105 and aggregation device S3 117 via aggregation devices (aggregators) 103/107/112 through links L1 106, L2 110 and L3 115, which also provides source P 105 access to all devices encompassed within any of the communication cells 104/108/113, including the intended speaker S22 116. Devices acting as aggregators for client devices 101, 105 may be hardware enabled dedicated access points 103 such as wireless routers or switches or may act as access points for client devices 109, 111, 114, 116, 117 using software-based access point (softAP) function 107, 112.

As is the case in the network topology diagram 170 in FIG. 1A, the smartphone, P 105 in FIG. 1B, 180, may only see source devices S0 101 and S1 107 as directly connected devices. However, S1 107 may report itself as an aggregate device that connects to standalone devices S11 109 and S12 111, both of which are co-located within communication cell 108 associated with device S1 107 and communication cell 113 associated with device S2 112. Aggregate device S2 112 may report that it connects to clients S1 107, S11 109, S12 111, S21 114, S22 116, and S3 117 and reports their connectivity as a "path score" based on signal strength and subnet. S1 107 may instruct S2 112 to drop aggregation of clients S11 109, and S12 111, because S1 107 may have a better path score to the devices S11 109 and S12 111. This may result in an automatic negotiation between aggregate devices that have access to shared client devices, which in turn, determines flow and storage of device discovery information and of media data flow. Automatic negotiation of topology may take place periodically. Devices may probe for local devices and access point connectivity periodically, as well. For example, if device S11 109 reports to S1 107 that it has a better path score to access point A 103 and aggregation device S2 112 than S1 107 does, S1 107 may request S11 109 to become a new aggregation device and enable its software access point and create a new communication cell (not shown) centered about it which may extend to encompass devices 103 and 112. In this case, device S1 107 drops its role as an aggregation device and disables its SSID and its communication cell 104 to allow S11 109 to be a more optimal alternate path from S2 112 to access point A 103. Alternate path selection may be initiated by a reported better path score via an alternate path. In another example, an alternate path may be selected if S1 107 is asleep, powered down, or removed.

Another way to implement a cellular arrangement topology of the embodiment may be in one traditional network wherein Wi-Fi would share a broadcast channel, a single SSID, and subnet, extended through use of aggregators not shown. This multiple cell, single network topology may allow simple setup using ubiquitous single wireless RF transceiver devices, however, this topology does not scale well as network communication, which for Wi-Fi and internet protocol (IP) is cooperative with collision mitigation, as even very moderate wireless rendering devices and links used for delivery of media content would quickly reach traffic saturation and slow to a point of being useless for media content delivery. One solution for this single network, single wireless RF channel, may be to use multiple wireless networks, on different broadcast channels, having separate SSIDs, and unique subnets 140, 150, 160 to form an extended wireless network from communication cells 104, 108, 113, such that intracellular communication is isolated to communication cells: 101, 103, 105; 109, 107, 111; 114, 112, 116, 117 and intercellular communications confined to the aggregators of each cell 103, 107, 112 greatly reducing traffic on each communication cell's IP network. This arrangement has been found to work well at scale. Using multiple wireless networks, each on a separate wireless RF channel and with a separate SSID requires that devices have two network adapters, one for communicating within the device's communication cell 104/108/113 and one to communicate with an adjacent cell, not shown here but is similar to that depicted in FIG. 2.

FIG. 1C illustrates a profile view 190 of the network topology 180, with the edges of communication cells 104, 108 and 113 aligning in both FIG. 1B and FIG. 1C. FIG. 1C is presented to illustrate the unique subnets 140, 150, 160 and their overlaps within the network topology 180. FIG. 1C is presented for illustration purposes only, and should not be construed to represent physical locations of subnets, but rather, accessibility of devices to subnets within this embodiment. As detailed above, a smartphone device P 105 may serve a role as source device S 105S. This may also be an actual media content source for the network 180, for example a wireless capable mp3 player, but in this example, a smartphone 105. A destination device D 109D, 114D, 117D, may be media content rendering devices such as wireless speakers S11 109, S12 114, S3 117. Some devices, such as aggregators 103, 107, 112 may serve both destination roles D when they receive media content data from source proximal devices 103D, 107D, 112D and sources S 103S, 107S, 112S as they transmit media content data to client devices 109/109D, 111, 114/114D, 116, 117/117D within their respective communication cells 104/108/113. Aggregator A 103 may also serve as media content sources 103S to distal network traffic aggregators 107 and 112.

FIG. 2 is a network topology diagram 200 illustrating another exemplary system for spatially extended media distribution and rendering, according to a preferred embodiment of the invention. As described in network topology 100 in FIG. 1, cellular arrangements as extended wireless networks may be made to scale successfully if each communication cell is set up to have its own wireless RF channel, SSID and subnet. That is, if they are set up to be independently functioning, overlapping wireless networks that are interconnected by a backbone of devices 215, 205, 210, 220, each comprising at least two wireless network adapters, either physical or virtual, software based high speed radios as have arrived in the market recently. In this embodiment, one network adapter A (215A, 205A, 210A, 220A), hardware or virtual, is configured to monitor and respond to network traffic within a device's communication cell 215C, 205C, 210C, 220C and a second adapter B (215B, 205B, 210B, 220B) to monitor traffic on an adjacent cell and to forward traffic there as needed. Looking at device 215, it becomes clear that one of its network adapters is a wired adapter 215B which brings cloud connectivity 250 to the entire extended cellular wireless network 200 (although of course wireless connectivity to cloud 250 is also possible and envisioned according to various embodiments of the invention). Other devices 225, 230, 235 are seen to have two network adapters but only one, the intracellular ones 225B, 230B, 235B are in use. In FIG. 1 these devices were those designated as destination-only devices D in network 190 hierarchy. Devices may possess at least two network adapters, used as differing roaming, environmental or device make-ups of an extended network as a whole, signal ranges and quality may change and client devices D may become aggregator devices A. Idealized communication cell signal profiles for each device 205, 210, 215, 220, 225, 230, 235 are shown 205C, 210C, 215C, 220C, 225C, 230C, 235C. Significant signal range overlap changes may result in changes in the depicted extended wireless media network topology 200.

Detailed Description of Exemplary Embodiments

Figure 3:
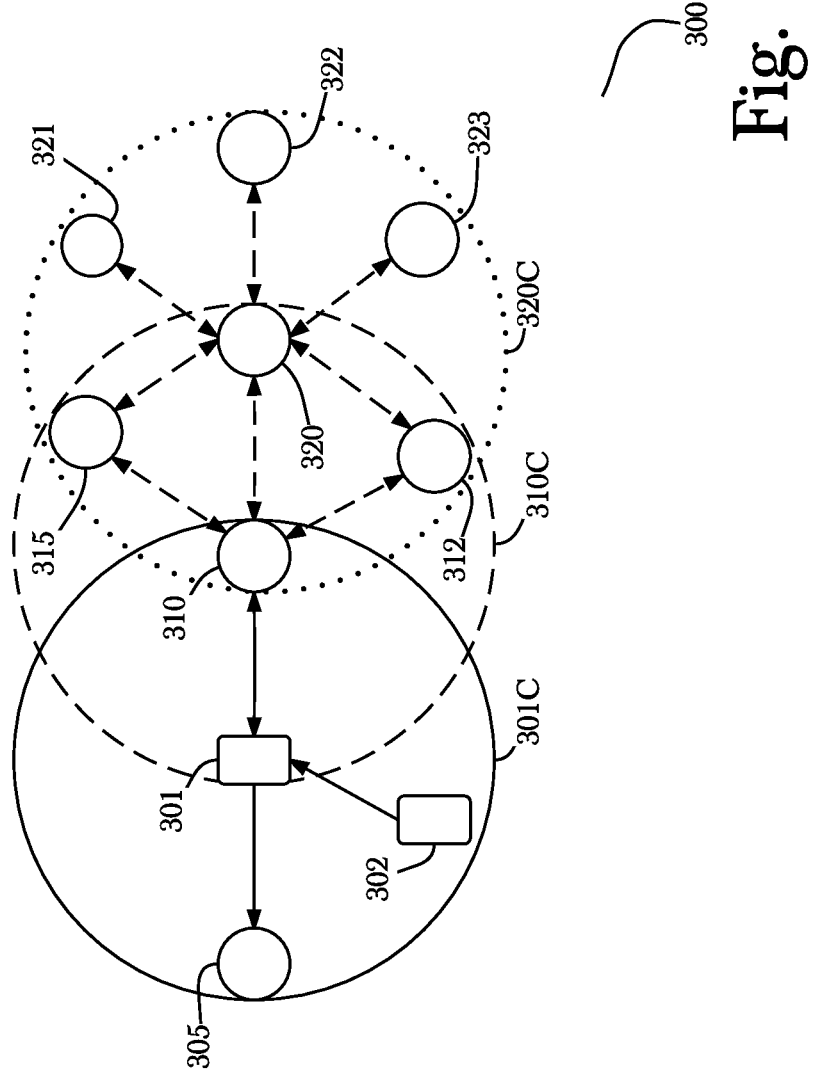
FIG. 3 is a network topology diagram illustrating an exemplary system for optimal path selection in a spatially extended media network, according to a preferred embodiment of the invention.

FIG. 3 is a network topology diagram 300 illustrating an exemplary system for optimal path selection in a spatially extended media network, according to a preferred embodiment of the invention. A path score and selection process is illustrated on FIG. 4, and may work as follows: considering a path from 310 to 315, 320 may report a path score made up of a hop count, in this case one hop, as a link L, through 320, 315, to 310 from 320 (herein denoted as L320.315) plus an average signal strength of P320.315 for Wi-Fi traffic from 315 and a message round trip response time score of T. This path score is reported as Path320.315(1, P320.315, T320.315). The signal strength P320.315 is reported in decibel milliwatts (dBm) and is the average signal strength of a sequential ten most recent seconds of packets received from 315 as reported by the network adapter 320. A message round trip response time score is a measure of an average estimated packet transmission time on a link in milliseconds. It may be recognized as a "ping time", even though a literal ping is not used to obtain this measure. Unlike in this example, if 320 has multiple paths to 315, it may route through a path selection algorithm, as described below, to choose an optimal path and report only one selected optimal path to 315. Each device that receives a path score to a device via an aggregation device, increments hop counts in a received path score. So in this case, 310 may receive a path score from 320 to 315 of Path320.315(2, P320.315, T320.315). Similarly, 310 reports a local path score of Path310.315(1, P310.315, T310.315) from 310 to 315.

Path scoring and optimal path selection algorithms may take place periodically, and each path score: Path a.b(H, Pa.b, Ta.b) is broadcast via multicast packets to all devices listening in a network or system.

As an example, 310 has two paths to 315: one path has a path score of Path320.315(2, P320.315, T320.315), via 310, and another path score has a path score of Path310.315(1, P310.315, T310.315), directly. 310 then applies a path selection algorithm to each number of available paths to each device, to select an optimal path. Generally, signal strength and timelines are not reliable measures unless they are particularly poor. So a first iteration of a selection process may be to discard paths with a timeliness factor that is poor, greater than a threshold timeliness, say, 50 milliseconds in this case. If timeliness factors are less than 10 msecs apart, they may be considered equivalent. Similarly, if a signal strength is below a threshold, 70 dBm in this case, this path is discarded. If signal strengths are within 10 db, then they may be considered equivalent. If either of these decisions results in zero paths, this elimination step is abandoned; however, at least one path to each device must exist. If there are two or more paths to a device, a lowest hop count path may be chosen. If this results in more than one path, a lowest timelines path may be chosen. If this results in more than one path, a highest signal strength path may be chosen. This iterative process may repeat until only one path from 310 to 315 is selected. Once an optimal path is selected by a device, it instructs all aggregation clients of non-optimal paths (paths that were not selected) to stop reporting it as an aggregation device for non-optimal path clients. Based on this process, 310 is likely to instruct 320 to drop aggregation of clients 315 and 312 because, 310 has better score to these devices. Similar optimal path selection processes may occur for all other devices 301, 305, 323, 322, 321 in extended network 300, but optimal path selection may tend to favor devices more central to each communication cell as aggregators have the functional radio broadcast ranges 301C, 310C, 320C that encompass a number of devices within each communication cell.

Another possible topology configuration for an extended wireless media delivery network is that aggregators are pre-designated by network designers during network erection, and all client devices automatically attach to a pre-designated, pre-configured aggregator based upon path score of an entire network; aggregators and client devices are pre-paired. These alternatives may be used when specific challenges exist in an establishment of an extended network or to ensure radio strength levels remain within close tolerances, or hops due to device roaming remains at a minimum. Assigning specific clients to specific aggregators manually may also allow special situations such as having two separate extended wireless media networks delivering separate content co-existing physically or overlapping in space concurrently, as one example of alternatives available to those knowledgeable in the art.

Figure 4:
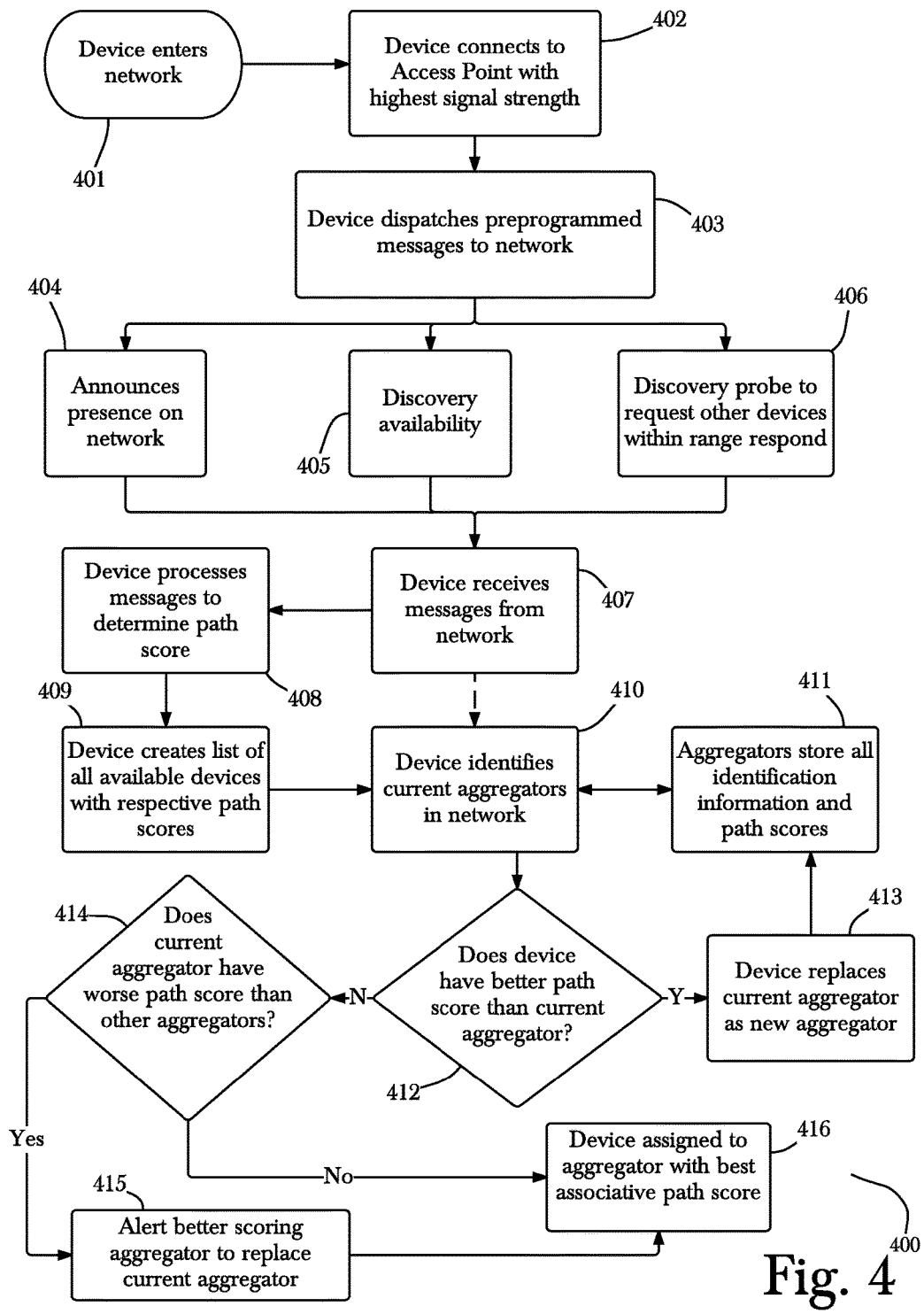
FIG. 4 is a process flow diagram illustrating an exemplary method for spatially extended media distribution and rendering, according to a preferred embodiment of the invention.

FIG. 4 is a flow diagram illustrating an exemplary method 400 for optimal path selection in a spatially extended media distribution and rendering system, according to a preferred embodiment of the invention. An extended media wireless network may be established by using a plurality of media rendering devices configured as interconnected nodes. Each device will first enter a network 401 by connecting to an access point SSID with a highest signal strength receiving IP address or similar and subnet or similar 402, before dispatching preprogrammed discovery messages 403 which may include an originator's IP to announce its presence on the network 404, a discovery availability message 405 or a discovery probe message 406 to request that other devices within range respond. In return, the device receives messages from the network 407 and uses the response message traffic to determine other devices available, their IP, subnet, access point, signal strength, average round trip transit time, number of hops, all of which are used to determine a path score 408, to create a list of all available devices with respective path scores 409. In a next step, the device identifies current aggregators 410 as a function of information returned in discovery messages 407 and lists created of all available devices 409 such that aggregators may store all identification information path scores 411 while an iterative subroutine initiates to determine an optimal path. First, a device determines if it has a better path score than its current aggregator 412 and if so, the device replaces the current aggregator to become a new aggregator 413, in which case the new aggregator stores all identification information and path scores 411 before identifying current aggregators in the new network 410, followed by the same step 412 in a next iteration to determine whether a device has a better path score than the current aggregator. In this iteration, the device is the current aggregator, and hence, it does not have a better score than itself, so then proceeds to a next step, does current aggregator have a worse path score than other aggregators 414. If in step 414, an outcome is positive (yes) then current aggregator alerts a better-scoring aggregator to replace current aggregator 415 before being reassigned to an aggregator with the best associative path score 416. If in step 414, an outcome is negative (no) then current aggregator is assigned with best associative path score 416. Discovery messages 404, 405, 406 may be multicast with IP addresses to elicit responses from other devices currently on the same wireless network. Messages initiate further discovery messages, both unicast between pairs of devices or multicast to exchange hop number data, signal strength data, and establish message response time data to allow calculation of path scores and drive the process 400 of determining an optimal path, being most efficient between connections. During this process 400, current aggregators, if present are identified through their transmission of all identification information and path score information of their client devices and possibly the information of distal aggregators and client devices. A new device may determine that there are devices within its communication cell and possibly in an adjacent communication cell for which it may be a more efficient aggregator 412. Under this condition the entering device 401 may request that aggregators servicing those clients release them from their managed device listing and the new entering device 401 replace them as their aggregator 413. It is also possible that during process 400 it will be found that, due to such factors as environment, device roaming or device removal, one or more of the current aggregators no longer has the best path scores for at least one of their clients 414. Under this circumstance an aggregator will remove those devices from its aggregation device list 415 and those devices will be added to a new aggregator with a better path score 416.

The path selection process 400 is recursive, in that each device selects an optimal path to each interconnected device it has access to and only reports this best or optimal path to other interconnected devices. This reduces network traffic and means each device only makes decisions regarding local clients, irrespective of whether they are aggregation clients. Since the process 400 is iterative, an optimal path to a device may dynamically change, especially considering changes to environment, number of available devices, devices may provide better paths to end devices. Similarly, if a device drops out, a path selection process will take place to select alternative paths to devices.

Figure 5:
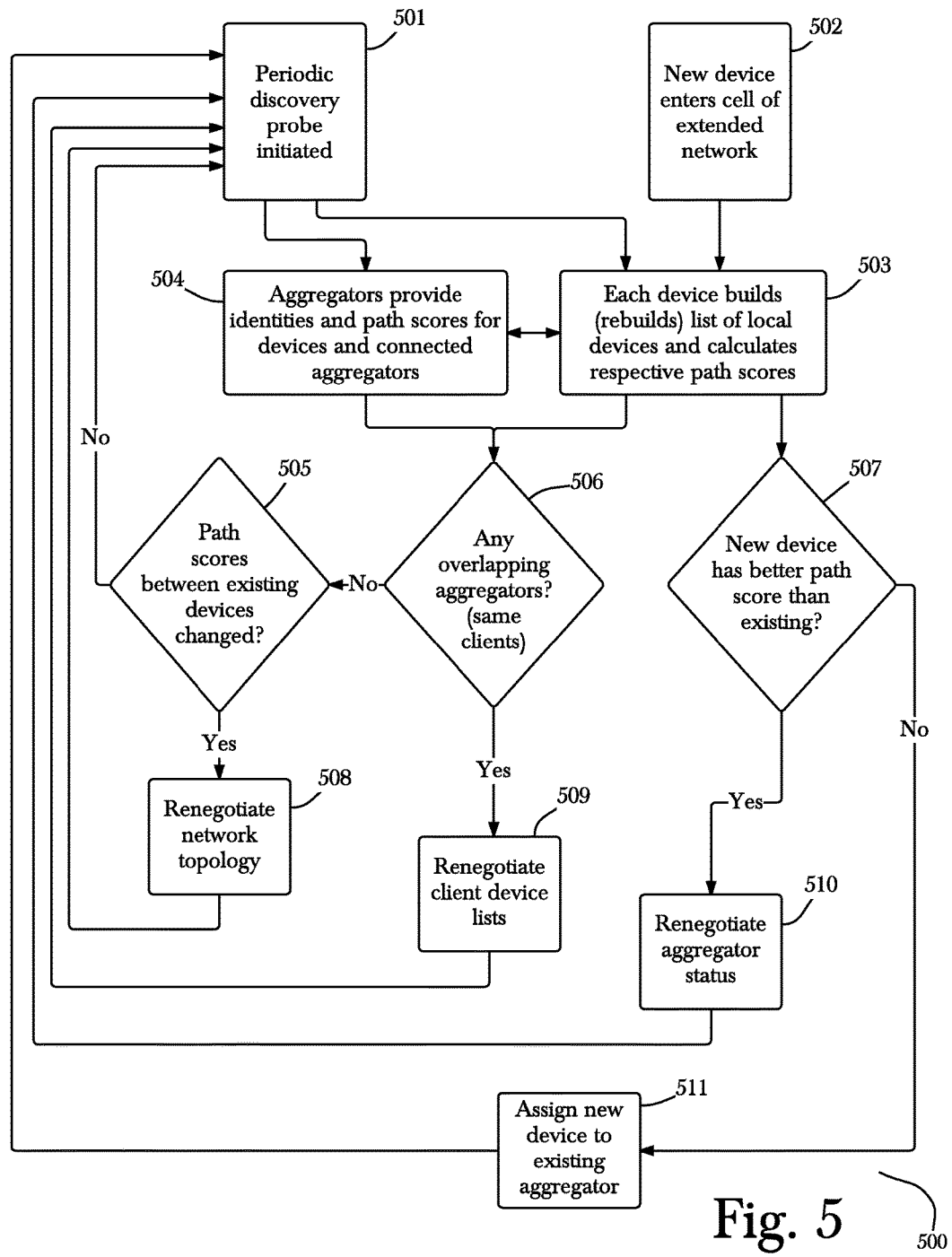
FIG. 5 is a process flow diagram illustrating an exemplary method for optimal path selection and maintenance thereof, in a spatially extended media distribution and rendering system, according to a preferred embodiment of the invention.

FIG. 5 is a flow diagram illustrating an exemplary method 500 for optimal path selection and maintenance thereof, in a spatially extended media distribution and rendering system, according to a preferred embodiment of the invention. Once an extended media delivery wireless network is established and functioning (refer to FIG. 4) periodic discovery message probe events may initiate 501 to maintain an optimal function of the embodiment. These discovery message processes may be initiated in multiple ways, two of which are pre-programmed periodic issuance of discovery probe messages to begin the process 501 and the entry of a new device onto an existing communication cell of an extended network 502, accompanied by a discovery availability message from that device. Both of these messages may lead to all devices on the extended network building and/or rebuilding their lists of devices 503 to which they may connect (for example, local devices), these lists including the signal strength, hop count and network message response times path scores of each device. Devices acting as aggregators may also provide identities and path scores for devices and connected aggregators 504, and publish associated lists of all devices that are their clients including path score. Listings from aggregators are recursive so all devices connected to each aggregator are included. If this is a periodic probe 501 and none of the path scores have changed 505, the process reverts to static operation until a next scheduled periodic device probe 501 occurs or a new device change is detected, for example, a new device enters the extended network 502. However, if path scores between existing devices have changed 505, due to a plurality of events which may include but not limited to, environmental changes, weather, radio interference or movement of transient radio obstacles into a communication cell, loss of one or more devices from the extended network, or physical movement of one or more devices within a communication cell's transmission range of the extended network, resulting in changed path scores for one or more devices, a renegotiation process to reassign aggregate and client roles within the cellular arrangement topology may occur 508. Once all path score driven realignments are complete the process 500 returns to steady state operation 501. At conclusion of the device discovery process 501, it may also be determined that one or more client devices are listed on an aggregation list of more than one aggregator 506. Such a state may lead to significant local network data flow inefficiency, especially if aggregators are in different communication cells, which may lead to jitter of an affected client's devices between communication cells. Under this condition, aggregators involved are messaged to resolve any conflict and renegotiate client device lists 509 such that only one aggregator claims a client device. Another circumstance may arise when a newly added device determines better path scores between itself and one or more client devices than an existing aggregator. It must be decided whether a new device has a better path score than an existing device 507, and if so, the new device renegotiates its aggregator status 510, as it may have a better path score to certain clients and certain aggregators than are currently configured. However, if the new device does not have a better score than existing 507, then the new device is assigned to an existing aggregator 511 and the process 500 returns to static operation.

FIG. 6 is a network topology diagram consisting of two views: FIG. 6A viewed in plan of an extended wireless media content delivery network 690, and FIG. 6B taken as a graphical representation 680 of the extended wireless media content delivery network 690, collectively presented to illustrate an exemplary system topology 600 for synchronization of media content playback on a spatially extended media distribution and rendering system, according to a preferred embodiment of the invention. Similar to FIG. 1B, FIG. 6A contains a plurality of devices: 602, 603, 606 and their associated communication cells: 630, 640, 650, respectively. Devices S0 614 linked through L0 613 to access point A 602, also connected to a smartphone acting as a source 601 and connected by link L1 612 to another aggregation device (aggregator) 603, all within a communication cell 630 centered about aggregator 602. Aggregator 603 links to aggregation device 606 by link L2 611, and also connects to local client devices S11 604 and S12 605 within its communication cell 640. Similarly, aggregator S2 606 links to aggregation device S3 609 (S3 communication cell not shown), and also connects to local client devices S21 607 and S22 608 within its communication cell 650. It is important to note that a media originator, such as in this example, P 601 need not be a smartphone, but may be any device as described above in 'Definitions' and may be a media source or even an originator of media being transmitted and distributed.

An extremely important challenge to address, especially when an extended wireless media content delivery network is large with multiple cells, is synchronous playback of media content at all locations as even devices in different cells may significantly reduce user experience of media content if unsynchronized sound is heard or unsynchronized images are continuously seen. A synchronization issue may occur when transmission times through a network, especially a wireless one, which may be slower than wired, takes time for each hop from 602 to 603 to 606 to 607 and, while an individual hop time for each hop, say between 602 to 603, may be very small, collectively from 602 to 603 to 606 to 607, may easily build to a noticeable length on a multi-hop, multi-cell network similar to that depicted in FIG. 6A 690. Depicted in 600, media content may be transmitted from a wireless source 601 over an extended wireless media content delivery network through a physical access point 602 that may also serve as an aggregator on an extended network communication backbone, comprising 602, 603, and 606 and their respective communication cells 630, 640, and 650. Looking at the graph 680, using 602 as a transmission start point, data propagation time 620 increases 622 with each hop to 603, 606, 609, labeled as a propagation distance 621. Continuing on with this example, if each rendering device played content back upon its receipt, there may be an ever-increasing delay from start of playback at 602 towards 613, and at some point on that traverse, delay may become noticeable with media content being out of synchronization. In another preferred embodiment, a remedy to ensuring synchronous playback of media content at all locations may be to synchronize all internal clock of each device before distributing media content and have all playback devices store media content and begin playback at a predestined time, on their internal clock, for example in an additional 0.5 seconds, to account for latency and allow media content to reach all devices before playback commences. If periodic media time references and corresponding, future internal clock times for playback of respective media content references are dispatched and internal clocks of all rendering devices are kept tightly synchronized to a system master, synchronous playback of media content at all locations may be achieved. The use of propagation offsets, determined by message response times for each device 603, 604, 605, 606, 607, 608, 609 also lead to satisfactory results as subtracting a message response time of a specific rendering device from a response time of a farthest known rendering device yield a prescribed amount of time to wait before a current device should begin playback. Again updates must be sent to account for network changes.

Figure 7:
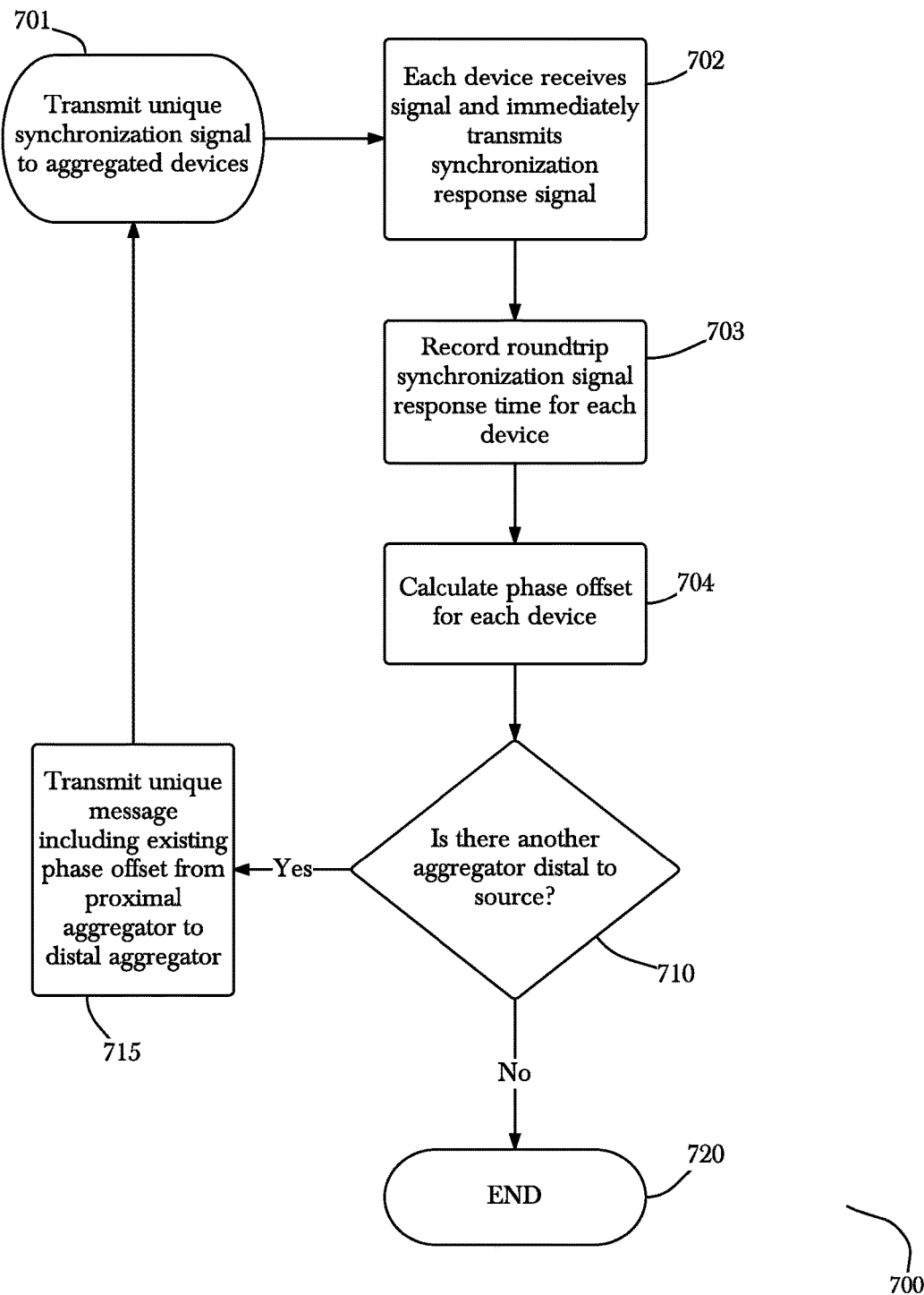
FIG. 7 is a process flow diagram illustrating an exemplary method for synchronization of media content playback on a spatially extended media distribution and rendering system, according to a preferred embodiment of the invention.

FIG. 7 is a process flow diagram illustrating an exemplary method 700 for synchronization of media content playback on a spatially extended media distribution and rendering system, according to a preferred embodiment of the invention. According to a preferred embodiment of the invention, an aggregator most proximal to a media content source transmits a unique synchronization signal to all aggregated devices 701, wherein each device receives the signal and immediately transmits a synchronization response signal 702. Each roundtrip synchronization signal response time is recorded 703 to calculate a phase offset for each device 704. The offsets determined in step 704 are then used to control commencement of streaming audio media data to each device such that all audio rendering devices in a communication cell play audio synchronously. If there is another aggregator distal to the source 710, then a unique message is transmitted including existing phase offsets from proximal aggregators to distal aggregators 715, but if not, then the process 700 ends 720.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 9:
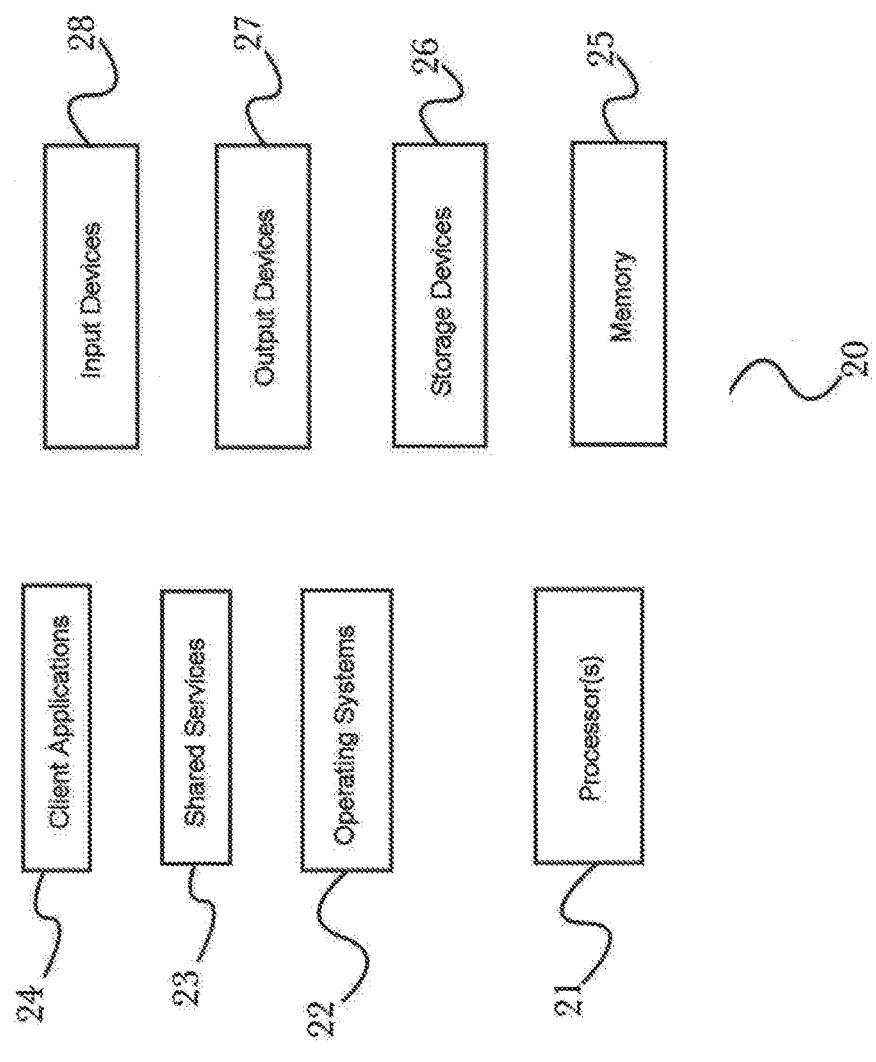
FIG. 9 is a block diagram illustrating an exemplary logical architecture for a client device, according to an embodiment of the invention.

In some embodiments, systems according to the present invention may be implemented on a standalone computing system. Referring now to FIG. 9, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 10:
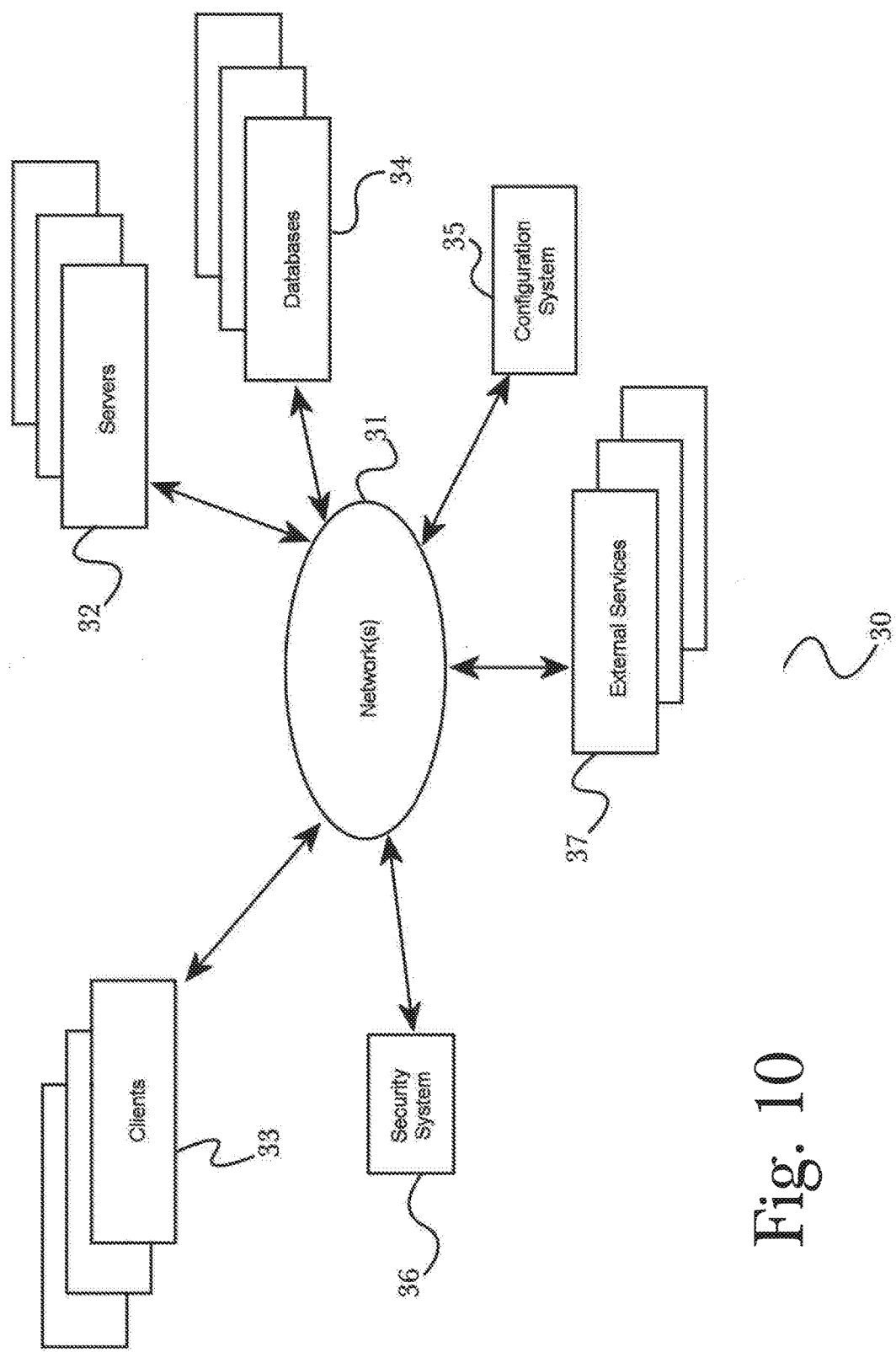
FIG. 10 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 10, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 9. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 11:
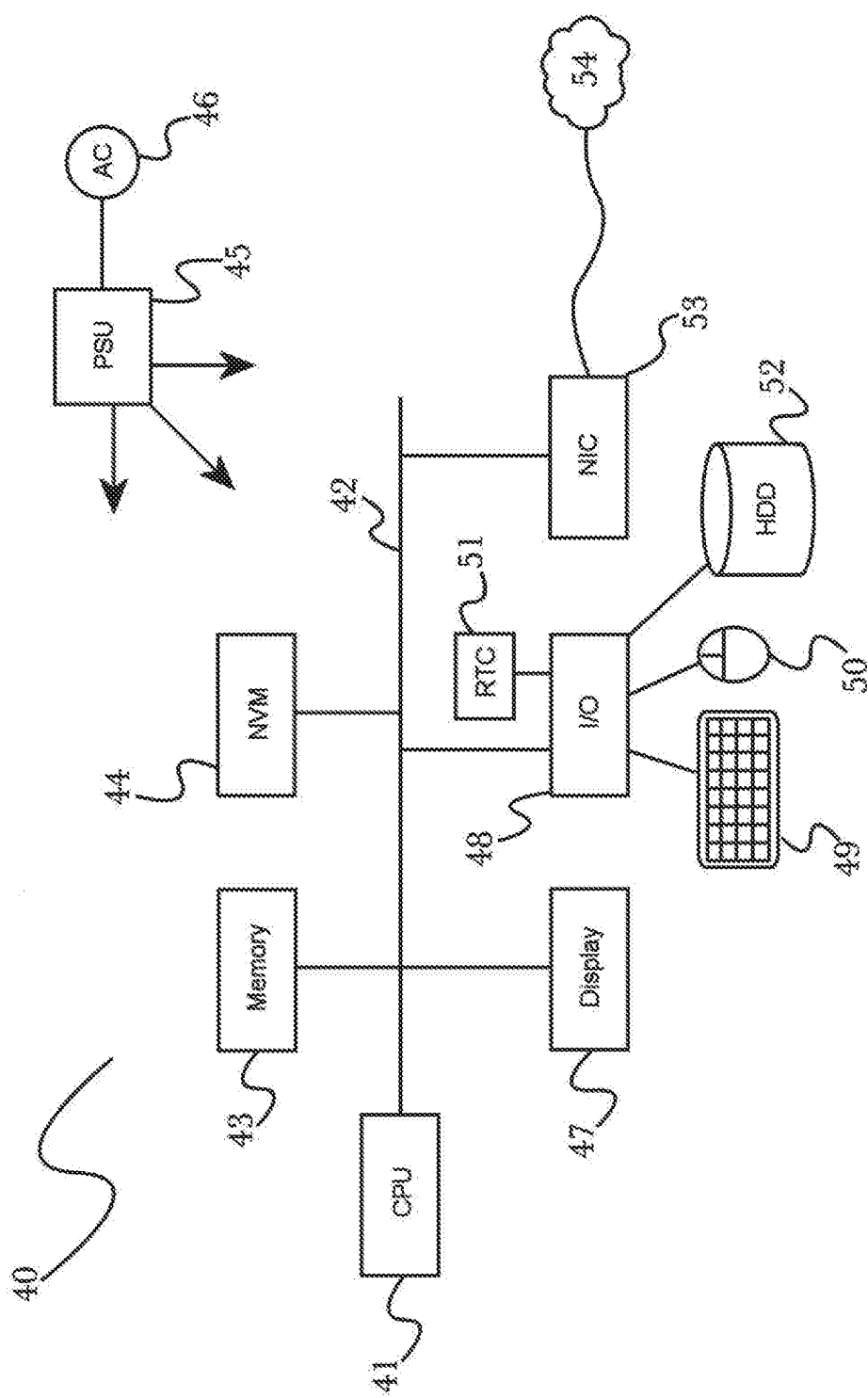
FIG. 11 is another block diagram illustrating an exemplary hardware architecture of a computing device used in various embodiments of the invention.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for media distribution and rendering over a spatially extended wireless network, comprising:
   a plurality of media rendering devices each comprising at least one wireless network adapter configured as nodes in a spatially extended wireless network;
   wherein the plurality of media rendering devices dynamically establish a hierarchical arrangement wherein a first media rendering device acts as a root node of the hierarchical arrangement;
   wherein the first media rendering device receives media content over a network and distributes the media content to the remaining media rendering devices using the hierarchical arrangement; and
   wherein the media content is rendered synchronously by each of the plurality of media rendering devices.

2. A method for media distribution and rendering over a spatially extended wireless network, comprising the steps of:
   (a) configuring a plurality of media rendering devices each comprising at least one wireless network adapter as nodes of a spatially extended wireless network;
   (b) dynamically establishing a hierarchical arrangement of the plurality of media rendering devices, wherein a first media rendering device acts as a root node of the hierarchical arrangement;
   (c) receiving media content via a network at the first media rendering device;
   (d) distributing the media content to the remaining media rendering devices using the hierarchical arrangement; and
   (e) synchronously rendering the media content by each of the plurality of media rendering devices.

* * * * *